Feb. 25, 1930.  W. L. ADAMS  1,748,404
LINE GUIDE MECHANISM FOR FISHING REELS

Filed June 26, 1924

Inventor
Walter L. Adams

By Brockett, Hyde & Milburn
Attorneys

Patented Feb. 25, 1930

1,748,404

UNITED STATES PATENT OFFICE

WALTER L. ADAMS, OF AKRON, OHIO, ASSIGNOR TO THE ENTERPRISE MANUFACTURING COMPANY, OF AKRON, OHIO, A CORPORATION OF OHIO

LINE-GUIDE MECHANISM FOR FISHING REELS

Application filed June 26, 1924. Serial No. 722,521.

This invention relates to improvements in fishing reels, and more particularly, in the level wind mechanism thereof.

Heretofore, the line guiding means of the level wind mechanism has been made up of three parts, a grooved block which embraces and slides along a pillar connecting the reel end heads and two elongated, substantially parallel members connecting and secured to said block and a carriage traveling between the end heads, said members being suitably spaced apart to provide a passageway for the fishing line.

The object of the present invention is to improve the construction of the line guiding means of the level wind mechanism by forming said means in one piece, said piece being slotted longitudinally to provide a passageway for the line and recessed at its outer end to receive the connecting pillar along which it is adapted to slide in laying the line upon the spool. The construction of the line guiding means is, therefore, materially simplified and the cost of manufacture of this part of the reel greatly reduced. Moreover, there are no parts connected by solder or the like to become loose or detached.

Figure 1:
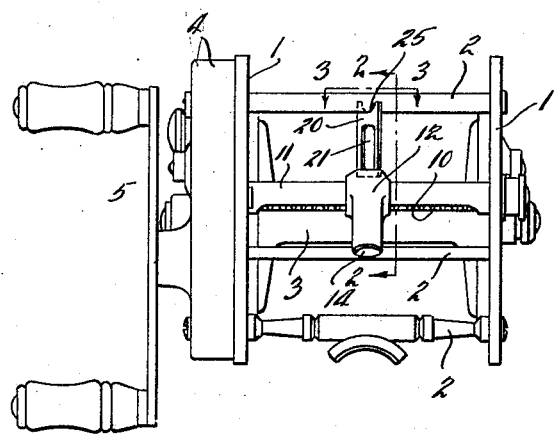
Figure 2:
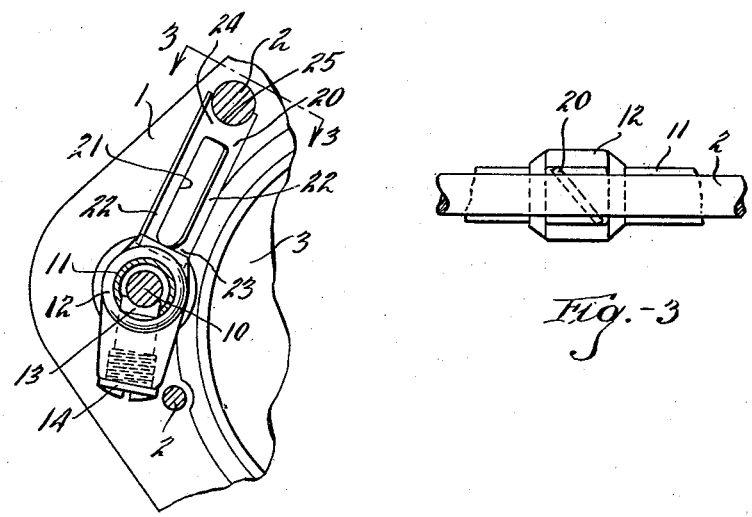
Figure 3:
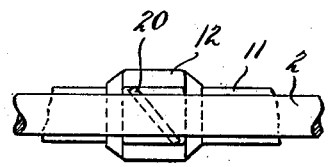

In the drawing, which illustrates one suitable embodiment of the invention, Fig. 1 is a front elevation of a fishing reel with the line guiding means thereof formed in one piece; Fig. 2 is a detail sectional view on the line 2—2, Fig. 1; and Fig. 3 is a detail plan view on the line 3—3, Fig. 1.

The reel shown in the drawing includes the usual end heads 1 connected by pillars 2 and between which end heads rotates a spool 3 upon which the line is adapted to be wound. The spool is operated by suitable gearing in the gear casing 4 attached to one end head, the gears being actuated by the operating handle 5.

The level wind mechanism includes a reversely threaded shaft 10 rotatable by the gearing in casing 4 and enclosed within a slotted protecting tube 11, the tube and shaft being endwise removable through an opening in that end head to which the gear casing is not attached. Sleeved and sliding upon the protecting tube 11 is a carriage 12 within which is a pawl 13 engaging the threaded shaft 10 through the slot in enclosing tube 11, said pawl being held within said carriage in engagement with said shaft by a threaded plug 14.

The line guiding means forming the subject matter of this application is formed in one piece, in the present instance, consisting of a slotted plate member 20 which may be stamped from a metal sheet or plate. Said plate member is permanently attached to the carriage 12 preferably in an askew or inclined position, as clearly indicated in Fig. 3. The slot 21 in the plate is adapted to receive the fishing line for guiding the same back and forth in levelling it on the spool and forms parallel upwardly extending line guiding arm portions 22.

The line guiding plate member is also formed with a base portion 23 adapted to enter and be soldered, brazed or otherwise permanently secured in a slot in the carriage top. The upper portion 24 of the plate member is recessed at 25 to embrace and slide along one of the pillars connecting the reel end heads, thereby avoiding any possibility of the line becoming looped over the top of the line guide member, as will be readily understood.

It will thus be apparent that I have materially simplified and improved the construction of the line guiding means of the level wind mechanism, making it more durable and less costly to manufacture. Among other things, the line guiding plate member may be made in a single operation, including the shaping of its exterior edges by cutting it from a sheet or severing it from a strip, the punching of the opening 21 through which the line travels, and the formation of the recess 25, the latter enabling said member to embrace and travel along one of the pillars and at the same time to have its opposite end firmly anchored or secured to the line guide carriage.

Other advantages of the invention will be apparent to those skilled in the art to which it relates.

What I claim is:

1. In a fishing reel, spaced end heads, a pillar connecting the same, a spool rotatable between said end heads, and level wind mechanism including a travelling carriage and a substantially flat one-piece line guide member of sheet metal secured to said carriage and provided with an opening through which the fishing line extends, the plane of said sheet being diagonal to the direction of travel of the carriage.

2. In a fishing reel, spaced end heads, a pillar connecting the same, a spool rotatable between said end heads, and level wind mechanism including a travelling carriage and a one-piece slotted line guide member diagonally disposed to and having its inner end secured to said carriage, the outer end of said member being recessed to receive the connecting pillar which it engages and along which it is adapted to slide.

3. In a fishing reel, spaced end heads, a pillar connecting the same, a spool rotatable between said end heads, and level wind mechanism including a travelling carriage having a diagonal slot in the periphery thereof, and a slotted line guiding plate member having one end secured in said carriage slot and the other end engaging said connecting pillar along which it is adapted to slide.

4. In a fishing reel, spaced end heads, a pillar connecting the same, a spool rotatable between said end heads, and level wind mechanism including a travelling carriage having a diagonal slot in the periphery thereof, and a slotted line guiding plate member having one end secured in said carriage slot and the other end thereof recessed to fit said connecting pillar along which it is adapted to slide in guiding the fishing line.

5. In a fishing reel, spaced end heads, a pillar connecting the same, a spool rotatable between said end heads, and level wind mechanism including a traveling carriage and a one piece line guide member having one end portion secured to said carriage and its other end portion engaging said connecting pillar along which it is adapted to slide, the line guiding portion of said member being arranged diagonally relative to said carriage.

6. In a fishing reel, spaced end heads, a spool rotatable therebetween, and level winding mechanism including a travelling carriage and a sheet metal line guiding member secured to said carriage with its plane at an acute angle to the direction of travel of said carriage.

In testimony whereof I hereby affix my signature.

WALTER L. ADAMS.